Patented Apr. 13, 1943

2,316,733

UNITED STATES PATENT OFFICE 2,316,733

ALIMENTARY PREPARATIONS

Charles Weizmann, London, England

No Drawing. Application January 21, 1941, Serial No. 375,357. In Great Britain November 20, 1939

5 Claims. (Cl. 99—21)

This invention relates to alimentary preparations.

For a period of many years, as the result of continued researches, I have provided processes for the preparation of alimentary products largely based on the use of yeast, sometimes enabling waste products or products of low cost to be utilised. Some of these processes have already been published in patent specifications, and some are not yet published.

I have now found that as a form of animal proteinaceous material, or more accurately perhaps, as an adjunct to and ordinarily associated with such material, I can use animal blood, thereby enabling me to employ as a basis substance available in large quantities as a waste product and capable of yielding a preparation which may be regarded as superior to an animal flesh product from several aspects. The employment of blood as a source of protein is especially made more attractive by the fact that use can be made of the proteolytic enzymes which are amply present in the leucocytes.

The invention consists in a process for the production of alimentary preparations according to which animal blood or serum obtainable from blood through separation of the red blood corpuscles from the whole blood is subjected to a predigestion or presolution treatment with enzymes such as papain, and afterwards subjected to the action of yeast enzymes for further or extensive proteolytic degradation, for instance, by treatment with an active yeast autolysate.

The invention also consists in a process according to either of the preceding two paragraphs in which animal blood and water are sterilised or pasteurised, then predigested with papain or other proteolytic enzymes at temperatures of the order of 65° C. for some six hours; the mixture is cooled, the magma is associated with yeast autolysate, produced from about the same weight of yeast as the weight of blood, and further proteolytic degradation effected at a suitable temperature over an appropriate period, for instance, at a temperature of about 37° C. (i. e. at a temperature favourable to proteolysis by the yeast enzymes) for a period of some 48 hours, until the product obtained contains a very high percentage of soluble nitrogen, a substantial proportion thereof being in the form of amino-nitrogen.

The invention also consists in processes for the preparation of alimentary products substantially as herein described and ascertained and in the products of those processes.

The invention may be carried into effect according to either of the following examples given by way of illustration only, all parts being by weight, and temperatures being in degrees centigrade.

Example 1

Animal blood to an amount containing about 3.5 parts of nitrogen is made up with tap water to 260 parts. The magma is sterilised for 2 hours at 100° C. or pasteurised at 75°–80° for 3-4 hours, and then subjected to predigestion by the addition of 0.07 part of papain, the mixture being kept at 65° C. for a period of 6 hours. There is then added to the magma after cooling to about 37° C. the yeast autolysate obtained by autolysis of 90 parts of yeast. The mixture is maintained for a period of 48 hours at 37° C. for further proteolytic degradation. The product obtained contains a very high percentage of soluble nitrogen, a substantial proportion thereof being in the form of amino-nitrogen.

Example 2

An amount of animal blood similar to that in Example 1 is made up to 500 parts with water and the mixture heated under pressure at a temperature of 105° C. for one hour. The product is incorporated in 260 parts of water and subjected to predigestion with 0.07 part of papain for 6 hours, the temperature being maintained at 65°. The resulting product is mixed with 90 parts of yeast autolysate (containing 1.62 parts of nitrogen) and the mixture is maintained at 37° C. for 48 hours. In this case also the yield contains a high proportion of soluble nitrogen, a substantial amount of which is in the form of amino-nitrogen.

General

I do not limit myself to the methods described in the examples. The quantity of water may be varied; the blood or the serum may be used directly without preliminary heating or pasteurisation.

The yeast autolysate may be prepared according to United States Patent No. 2,141,455 and United States applications numbered serially 153,283 and 234,487, and other information contained in those specifications may be used for the present invention as far as circumstances require or permit.

Blood may be used in the form of whole blood or as a separated serum, the latter being especially useful from the point of view of digestibility. The blood may be used in liquid form, natural or concentrated or in dried form.

The papain or the like proteolytic enzyme may be activated before use by a small quantity of yeast autolysate.

Whilst papain is named, other proteolytic enzymes such as bromelin or pepsin may be employed. As blood contains an ample amount of proteolytic enzymes by itself in the leucocytes the pretreatment stage with papain or similar enzymes may be replaced by a suitable period of incubation during which action of the proteolytic blood enzymes takes place. The temperature and times of the treatments or stages may generally, as affects the presolution, be as given above, but a 48 hours' period can be shortened for instance if a less extensive period of degradation or proteolysis is required, e. g. a lower percentage of amino-nitrogen in the product.

The process of the present invention may be carried out in the presence of a small quantity of toluene or the like for the avoidance of putrefaction of the material.

Antiseptics when used should preferably be eliminable by distillation during, for instance, concentration of the product to the desired consistency or condition. Toluene, benzene, chloroform and ether are suitable antiseptics for the present invention.

I claim:

1. A process suitable for the production of alimentary preparations from animal blood and from serum obtained from blood through separation of the red corpuscles from the whole blood, which comprises mixing animal blood to an amount containing about 3.5 parts of nitrogen with about 260 parts of water, heating the mixture at a temperature between 75° C. and 100° C. for from two to four hours, predigesting the heat treated mixture by the addition of about 0.07 part of papain, and maintaining the mixture at a temperature of about 65° C. for a period of six hours; cooling the magma thus produced to about 37° C., adding yeast autolysate obtained by autolysis of about 90 parts of yeast, and further proteolytically degrading the mixture by maintaining it for a period of about 48 hours at a temperature of about 37° C.

2. A process suitable for the production of alimentary preparations from animal blood and from serum obtained from blood through separation of the red corpuscles from the whole blood, which comprises mixing animal blood to an amount containing about 3.5 parts of nitrogen with about 500 parts of water, heating the mixture under pressure at a temperature of about 105° C. for about one hour, incorporating the product in about 260 parts of water, subjecting the resulting mixture to predigestion with about 0.07 part of papain, and maintaining the temperature at about 65° C. for about six hours, mixing the resulting product with about 90 parts of yeast autolystate containing about 1.62 parts of nitrogen, and finally maintaining the mixture at a temperature of about 37° C. for about 48 hours.

3. In the production of alimentary preparations from animal blood and blood serum, the two-stage process which comprises predigesting such a material with an enzyme selected from a group consisting of papain and bromelin under conditions promoting enzymatic action, and then subjecting the resulting product in a second stage to the action of yeast enzymes under different conditions promoting the action of said yeast enzymes.

4. The process of claim 3 wherein the predigestion step is conducted at a temperature of about 65° C.

5. The process of claim 3 wherein said second stage is conducted at a temperature of about 37° C.

CHARLES WEIZMANN.